US010255044B2

(12) United States Patent
Nash

(10) Patent No.: US 10,255,044 B2
(45) Date of Patent: Apr. 9, 2019

(54) METHOD AND SYSTEM FOR MODIFYING DEPLOYED APPLICATIONS

(71) Applicant: MAKE APPS BETTER LTD., London (GB)

(72) Inventor: Peter Nash, London (GB)

(73) Assignee: MAKE APPS BETTER LTD, London (GB)

(*) Notice: Subject to any disclaimer, the term of this patent is extended or adjusted under 35 U.S.C. 154(b) by 0 days.

(21) Appl. No.: 14/567,549

(22) Filed: Dec. 11, 2014

(65) Prior Publication Data

US 2015/0169318 A1 Jun. 18, 2015

Related U.S. Application Data

(60) Provisional application No. 61/916,513, filed on Dec. 16, 2013.

(51) Int. Cl.
| | | |
|---|---|---|
| *G06F 9/44* | (2018.01) | |
| *G06F 8/34* | (2018.01) | |
| *G06F 8/41* | (2018.01) | |
| *G06F 8/656* | (2018.01) | |

(52) U.S. Cl.
CPC .............. *G06F 8/34* (2013.01); *G06F 8/41* (2013.01); *G06F 8/656* (2018.02); *G06F 2209/541* (2013.01)

(58) Field of Classification Search
CPC ........ G06F 17/2247; G06F 13/14; G06F 8/41; G06F 9/45516; G06F 11/0742; G06F 2209/541; H04L 65/403; H04L 67/02
See application file for complete search history.

(56) References Cited

U.S. PATENT DOCUMENTS

| | | | |
|---|---|---|---|
| 2004/0148576 A1 | 7/2004 | Matveyenko et al. | |
| 2007/0124367 A1* | 5/2007 | Fan | G06F 11/0742 709/203 |
| 2009/0271771 A1* | 10/2009 | Fallows | G06F 9/45516 717/137 |
| 2010/0146481 A1 | 6/2010 | Binder et al. | |
| 2011/0099467 A1* | 4/2011 | Kapur | H04L 67/02 715/236 |
| 2011/0119605 A1 | 5/2011 | Jayadevan et al. | |
| 2011/0307772 A1* | 12/2011 | Lloyd | G06F 17/2247 715/212 |

(Continued)

FOREIGN PATENT DOCUMENTS

| | | |
|---|---|---|
| EP | 0 587 394 A1 | 3/1994 |
| WO | WO 2009/139964 A1 | 11/2009 |

OTHER PUBLICATIONS

GB Search Report dated Jun. 12, 2015 in GB Application No. 1322239.3 (4 pages).

*Primary Examiner* — Tuan A Vu

(74) *Attorney, Agent, or Firm* — Nixon & Vanderhye P.C.

(57) ABSTRACT

The present invention relates to a method of dynamically modifying a deployed application including an embedded library, including: during execution of the application, the library transmitting a model about the visual appearance of the application to an editing component; receiving input from a user at the editing component to generate instructions utilizing the model; and transmitting the instructions to the application which, in turn, modify the application. A system for dynamically modifying a deployment application is also disclosed.

28 Claims, 11 Drawing Sheets

(56) References Cited

U.S. PATENT DOCUMENTS

| | | | | |
|---|---|---|---|---|
| 2013/0132932 A1* | 5/2013 | Van Rozen | ............... | G06F 8/41 |
| | | | | 717/124 |
| 2014/0063027 A1* | 3/2014 | Becker | .................... | G06F 13/14 |
| | | | | 345/520 |
| 2014/0149836 A1* | 5/2014 | Bedard | ............... | G06F 17/2247 |
| | | | | 715/212 |
| 2014/0173461 A1* | 6/2014 | Shahade | ............... | H04L 65/403 |
| | | | | 715/753 |

* cited by examiner

METHOD AND SYSTEM FOR MODIFYING DEPLOYED APPLICATIONS

This application claims the benefit of U.S. Provisional Application No. 61/916,513, filed on Dec. 16, 2013, the entire content of which is hereby incorporated by reference.

FIELD OF INVENTION

The present invention is in the field of software development. More particularly, but not exclusively, the present invention relates to dynamic modification of deployed applications.

BACKGROUND

In modern software application development and deployment, it is common for one version of an application to be in use by users and for users to be able to update their application to a new version via an automated or semi-automated process over a communications connection. This new version may contain new functionality, new appearance and/or new content.

For example, one common method of deploying new versions of applications involves monitoring a server and notifying a user at their device (such as a smart-phone, tablet, or personal computer) when a new version is available. The new version can then be selected to update their current version. Another method of updating applications is in use on iOS 7 devices and Android devices, where the operating system on the device automatically downloads and installs new versions of applications existing on those devices.

In both instances, updating the application at the software developer side involves updating the code base, preparing the app submission and awaiting a review from the deployment manager (such as Apple for the Appstore). This process takes hours and is high risk as bugs can easily have entered the code base by mistake. Also the download size for application updates is significant as the entire app is downloaded and reinstalled it. The download size imposes two big problems. Firstly it's a wasteful use of an expensive 3G connection, and so is disabled by default by the operating systems of most portable devices. Secondly, larger apps, can reach 500 mb and, even over wifi, this can be quite a slow way to update an app.

The other way to deliver new functionality or appearance to a user of an application is to use web-based applications. Apps use HTML to deliver appearance in varying degrees. Apps can be a "pure native app" which use no HTML styling at all. Or they can be a "hybrid app", which use mostly native components to standardize appearance of navigation, but use HTML to present formatted content, which would be time consuming to develop for native presentation. At the furthest extreme apps can be completely HTML—a "web page in an app". These apps use HTML to present both content and navigation structures such as tabs.

Pure native and hybrid apps (both to be referred to as native apps) have differing benefits to pure HTML apps. Pure HTML apps have advantages based around HTML being a standard web formatting for content, such as blog posts. This is ideal for apps with a lot of web formatted content, but the downsides are when the native SDK (Software Development Kit) implements some of the styling better, such as navigational structures like tabs. This is especially problematic when a new OS radically changes the appearances of the standard app. This results in significant redevelopment effort as the HTML app is rewritten to migrate to the new styling.

Native apps have the best of both worlds as they can embed HTML content and keep the standard look and feel of the native OS. Furthermore, for more complicated apps, native has more advantages, as they execute significantly faster on the device than web content and generally feel more responsive for the user.

Therefore, there is a desire for a system to facilitate dynamic modification of deployed applications.

There are some existing approaches for dynamic updating of applications, but many applications are able to only update their content dynamically and not their appearance or functionality.

Some A/B testing companies provide solutions to updating an app's appearance, but these methods do not change the applications' appearance dynamically and simply enable some hardcoded style to become visible. Other A/B companies enable remote restyling using HTML within pure HTML applications to present a new appearance.

Furthermore, during development of applications, it is often desirable to be able to preview the application. There are three techniques for doing this. The first is to deploy directly to a device (for example, using the Xcode IDE). The second is to connect to a device emulator running as a virtual machine on the developer's machine (for example, using the Android SDK). The third is where a simulated application is generated by the IDE for execution directly on the developer's machine (for example, as supported within the Xcode IDE).

The disadvantages of the above techniques is that (a) the source code of the application is required during this phase and (b) the source code must be modified and the application recompiled for any development iteration that requires previewing. This introduces the possibility of bugs into the code, restricts development in this phase to skilled programmers, and slows down development.

Therefore, there is also a desire for a system which facilitates the development of applications.

It is an object of the present invention to provide a method and system for dynamically modifying deployed applications which overcomes the disadvantages of the prior art, or at least provides a useful alternative.

SUMMARY OF INVENTION

According to a first aspect of the invention there is provided a method of dynamically modifying a deployed application including an embedded library, including:
a. during execution of the application, the library transmitting a model about the visual appearance of the application to an editing component;
b. receiving input from a user at the editing component to generate instructions utilising the model; and
c. transmitting the instructions to the application;
wherein the instructions modify the application.

The application may be deployed on a first device and the editing component may be executing on a different, second device, such as a developer's machine.

The library may transmit a screenshot of, at least part, of the visual display of the executing application to the editing component.

The instructions may be transmitted to a plurality of applications deployed on a plurality of devices.

The instructions may be transmitted to each application of the plurality of applications upon request by that application.

The editing component may generate a simulation of the application utilizing the model. The editing component may also utilise the screenshot to generate the simulation. The editing component may display the simulation to the user.

At least a part of the instructions may be encoded within CSS.

The instructions transmitted to the application may be received by the library, which may apply their modifications to the application.

The instructions may include modifications to the visual appearance of the application and/or to the functionality of the application.

The model may be encoded within JSON.

The input may be provided by the user within a graphical user interface such that visual components within the visual appearance are directly edited by the user.

Editing of the visual components may include one or more of repositioning, deletion, resizing, changing the colour or font, changing an image, and changing text content.

The library may transmit the model to the editing component when changes to the visual appearance are detected.

The same library may be embedded within a plurality of different applications.

The application may be a native application.

The method of the first aspect may further include the step of the application receiving the instructions and modifying itself (i.e. via the library). After the application receives the instructions and is modified, step (a) may be repeated.

According to a further aspect of the invention there is provided a system for dynamically modifying deployed applications, including:
  a first apparatus comprising:
    a display;
    a processor; and
    a memory;
  wherein the first apparatus is configured to execute an application comprising an embedded library, to execute the library to transmit a model about the visual appearance of the application to an editing component at the second apparatus, and to receive instructions from a second apparatus to modify the application; and
  a second apparatus comprising:
    a display;
    an input;
    a processor; and
    a memory;
  wherein the second apparatus is configured to receive the model from the first apparatus, to receive input from a user at the editing component to generate instructions utilising the model, and to transmit the instructions to the application on the first apparatus.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a method and system for dynamically modifying deployed applications. This method and system may be used to facilitate rapid development of an application by providing the developer with the ability to preview changes within a deployed application as the changes are made.

Figure 1:
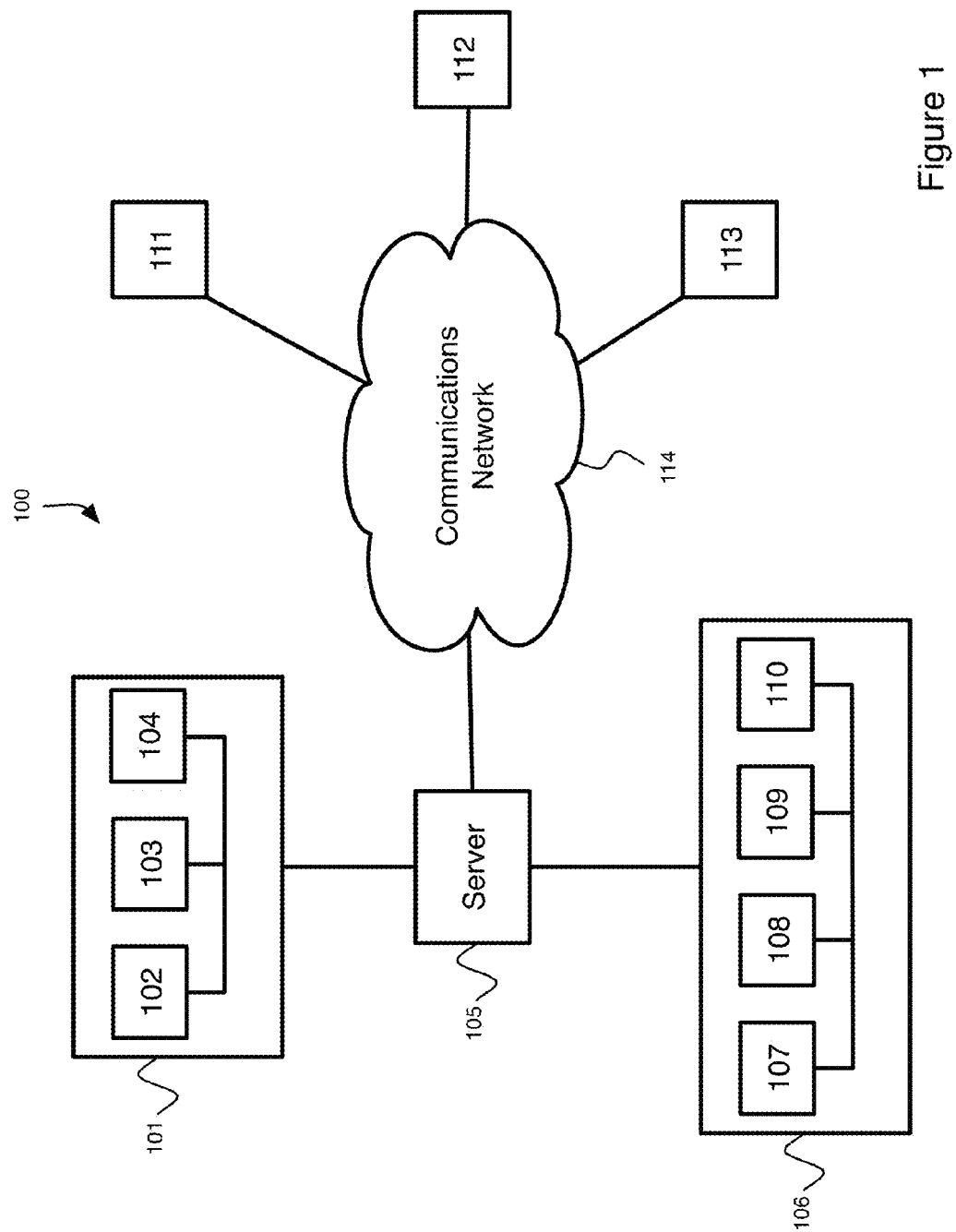
FIG. 1: shows a block diagram illustrating a system in accordance with an embodiment of the invention.

In FIG. 1, a system 100 in accordance with an embodiment of the invention is shown.

A first device 101 is shown. The first device 101 may be a smart-phone, tablet, personal computer or other device.

The first device 101 may include a processor 102, a memory 103, and a display 104.

The memory 103 may be configured to store an application. The application may be a native application, that is, the application may be coded in the language of the platform that the operating system on the device 101 provides. The application includes a user interface comprising one or more views. Each view may in turn comprise further views. A view may comprise a visual component, such as a text field, a button, a label, etc.

The application may include an embedded library. The library may be configured for embedding into any application suitable for deployment to the platform of the device 101.

The application may be deployed on to the device 101 via an application store (such as the Apple AppStore or Google Play store).

In one embodiment, the application may be configured to operate in two modes: a preview mode and a non-preview mode.

The first device 101 may be connected via a communication channel to a server 105.

A second device 106 is shown. The second device 106 may include a processor 107, a memory 108, an input 109, and a display 110.

The server 105 may be connected via a communications channel to the second device 106.

The second device 106 may be configured to display the interface for an editing component. The editing component may be stored locally at the memory 108 or the interface may be delivered from the server 105.

The library may be configured for transmitting information about the application to the editing component when executing on the first device 101. The editing component may be configured to generate a representation of the application from the information received at the second device 106, or server 105, and display it on the display 109. The information may include a model representing the visual appearance of the application and may include a screenshot of what the application is currently displaying on the display 104.

The library may be configured for transmitting the information only when the application is in preview mode.

The editing component may be configured to receive instructions from a developer at the input 109 to modify the application.

The editing component may be configured to transmit those instructions to the application on the first device 101.

The application on the first device 101 may be configured to apply those instructions such that the application is modified by the instructions. It may the library within the application that receives and applies the instructions to modify the application.

In one embodiment, the server 105 is not utilised and the first device 101 is connected to the second device 106. In this case, the devices 101 and 106 communicate directly, for example, via a communications network.

The server 105 may be connected to a plurality of user devices 111, 112, and 113 via a communications network 114.

The instructions may be transmitted from the server 105 to the plurality of user devices 111, 112, and 113 to modify applications on those devices.

Figure 2:
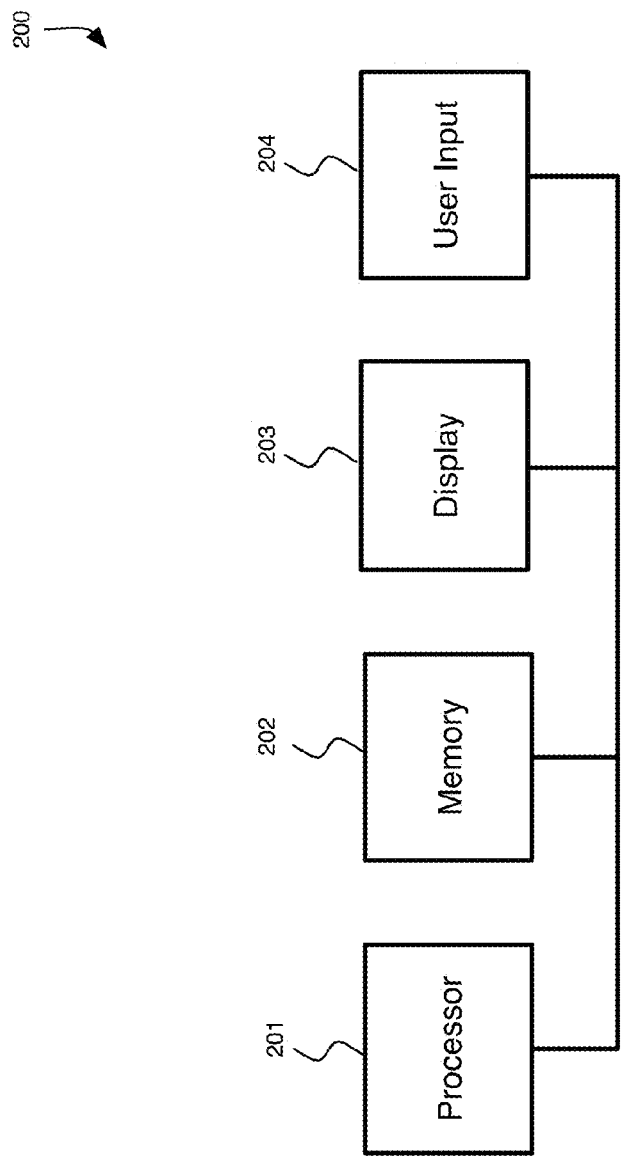
FIG. 2: shows a block diagram illustrating an alternative system in accordance with an embodiment of the invention.

In FIG. 2, an alternative system in accordance with an embodiment of the invention is shown.

A device 200 is shown. The device 200 may comprise a processor 201, a memory 202, a display 203, and an input 204.

The application including the library may be stored within the memory 202. The device 200 may be configured to execute the application.

The device 200 may execute the application within a simulator on a virtual machine.

The device 200 may be configured to display the interface for an editing component on the display 203. The editing component may be stored locally at the memory 202 or the interface may be delivered from a server (not shown).

The library may be configured for transmitting information about the application to the editing component. The editing component may be configured to generate a representation of the application from the information received and display it on the display 203.

The editing component may be configured to receive instructions from a developer at the input 204 to modify the application.

The editing component may be configured to transmit those instructions to the application.

The application may be configured to apply those instructions such that it has been modified.

Figure 3:
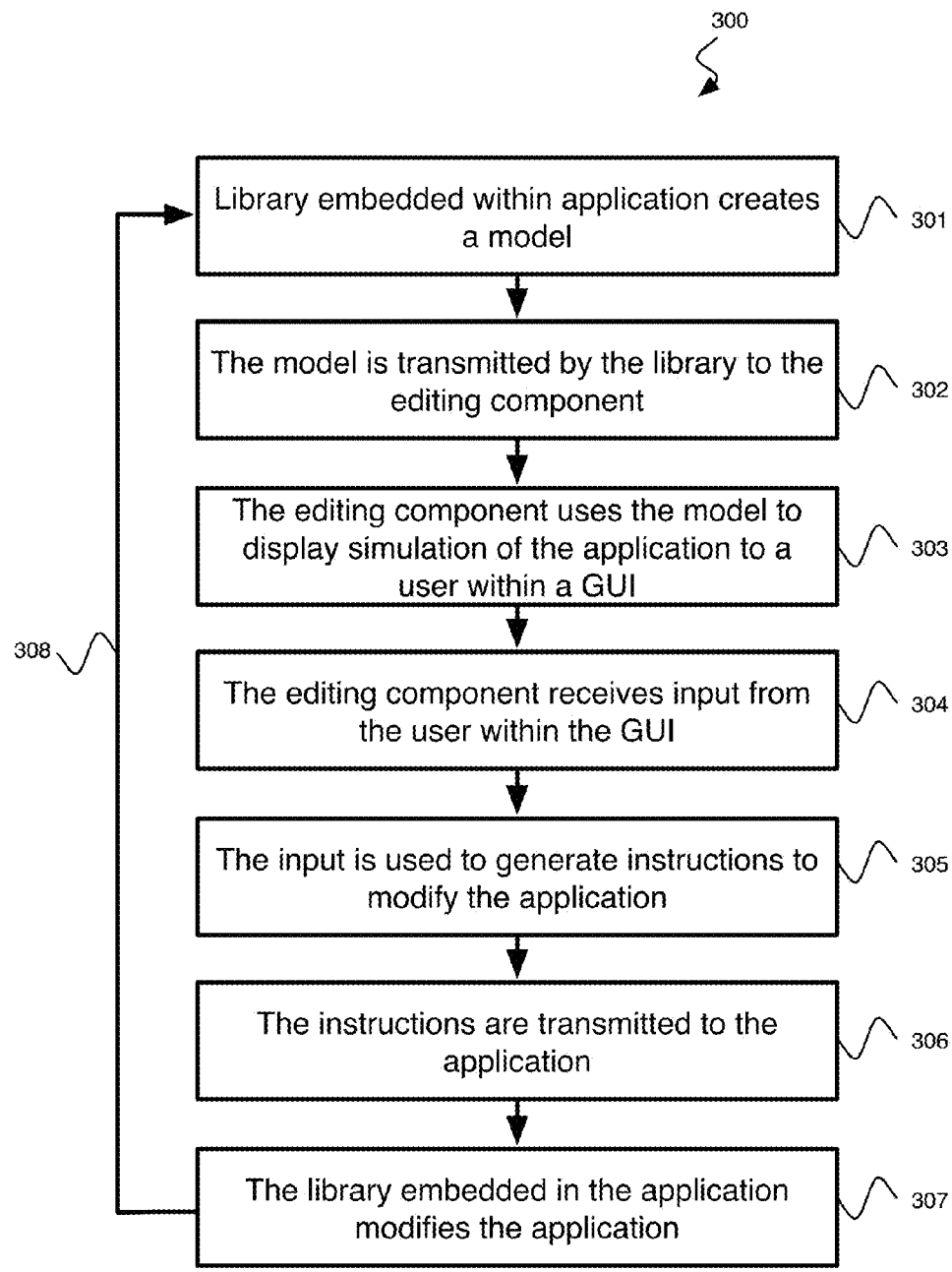
FIG. 3: shows a flow diagram illustrating a method in accordance with an embodiment of the invention.

A method 300 in accordance with an embodiment of the invention will now be described with reference to FIG. 3.

In step 301, when the application is executing, the library may create a model from the visual appearance of the application.

The library may create a model by building a JSON structure of the interface of the application by traversing each view in the interface of the application. The model may be created by recursively traversing each view in the interface and repeating for its respective sub views. The model may include a unique id for each component within the views.

The model may contain information for each view such as:

1) Layout
2) The view's type, a human readable term like button or label
3) Current style, as CSS properties, such as "background: red"
4) The controller in which the view is found, such as "registercontroller"
5) A list of non-unique ids with increasing generality, such as "input[type=text], input"
6) And a globally unique id, such as "#firstButton"

The current style may be formed using instructions previously received by the library from the editing component or may be generated in CSS from the native styling format.

The creation of the model and the generation of globally unique ids will be further described later in this document in relation to FIGS. 4*a* to 4*d*.

In an alternative embodiment, the unique id is generated at the editing component instead of at the library.

In step 302, the library may transmit this model to the editing component. The library may also transmit a screenshot (or part of a screenshot) from the application. The screenshot may be encoded in WEBP, for example, or JPEG or PNG when WEBP is not available.

The library may generate and transmit the model in response to changes in the application. For example, the library may detect addition, modification, or deletion of views of the application.

In one embodiment, the library may not be able to detect changes due to limitations in the platform. In this case, the library may generate and transmit the model when it receives any instructions from the editing component.

In one embodiment, when the user interacts with the application, the library generates and transmits new screenshots to the editing component so that a visual simulation of the application at the editing component reflects the current visual state of the application.

In step 303, the editing component may use this model (and screenshot) to display a visual representation of the application, for example, within a graphical user interface.

The editing component may display the screenshot of the application and be responsive to interaction within the graphical user interface by the user to select components within the screenshot using the model information. Context-specific options to modify the component may be displayed to a user when a visual component is selected.

Options for navigating within the model may be displayed within the graphical user interface to assist users in navigating through the components and nested views.

Further detail in relation to the graphical user interface provided by the editing component will be described in relation to FIG. 5 later in this document.

In step 304, a user (such as a developer) may provide input to the editing component (for example, within the graphical user interface) to modify the application.

For example, the user may reposition, resize, add or delete components within a view, and/or the user may edit the content displayed in the components (e.g. text or image content) or the properties of the components (such as style attributes of the components). In one embodiment, the view is converted into a programmatically editable format, such as CSS, and the user is able to directly edit the CSS.

In one embodiment, the user can provide input to include or modify local assets used within the application.

Further detail on the modifications that may be made by user will be described in relation to FIGS. 6 to 8 later in this document.

In step 305, in response to this input, the editing component may generate instructions to modify the application.

The instructions may be generated as a series of CSS rules containing a set of selectors and a set of properties. The selectors may correspond to the unique identifiers of the components (to identify the components affected). In one embodiment, the properties include non-CSS properties, such as general content or configuration details. This may permit the updating of local assets (such as configuration files) and the addition of features such as analytics.

In one embodiment, the XPath standard for identifying components rather than CSS selectors could be used.

In step 306, these instructions may be transmitted to the application.

In step 307, the library within the application may implement these instructions to modify the application.

The process may repeat 308 such that the library recreates the model due to possible changes in the visual appearance of the application caused by the instructions (and/or, in one embodiment, user activity in the application).

One embodiment of the invention will be described with reference to FIG. 4a, which shows a screenshot of an application, FIG. 4b, which shows a hierarchical view structure corresponding to the form view displayed in the application in FIG. 4a, FIG. 4c which shows information relating to the form view, and FIG. 4d which shows information relating to an address component within the form view.

Figure 4B:
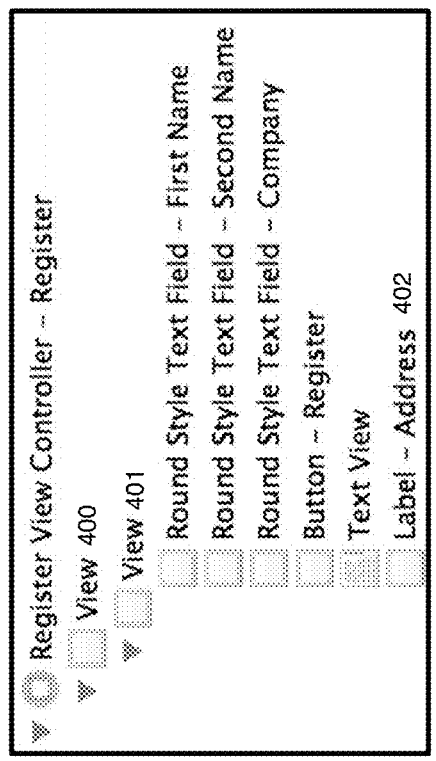
FIG. 4b: shows a diagram illustrating a view structure of an application in accordance with an embodiment of the invention.
Figure 4A:
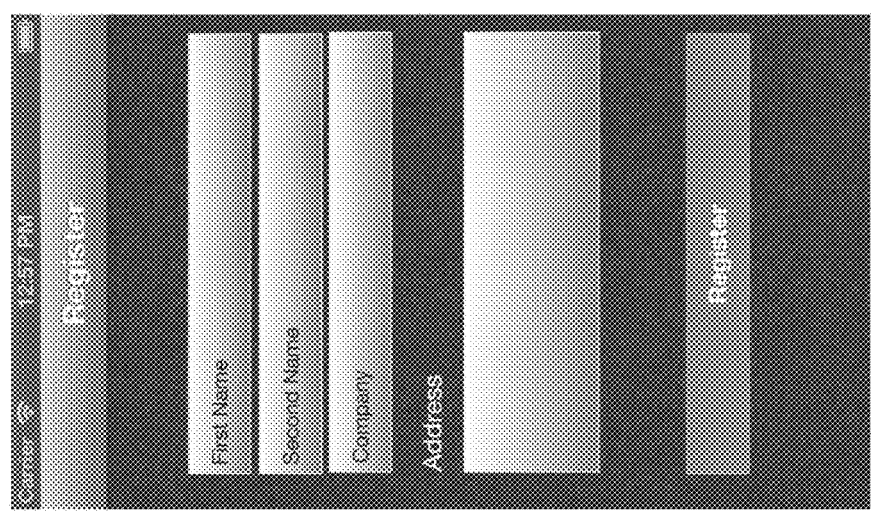
FIG. 4a: shows a screenshot of an application executing on a device in accordance with an embodiment of the invention.
Figure 4C:
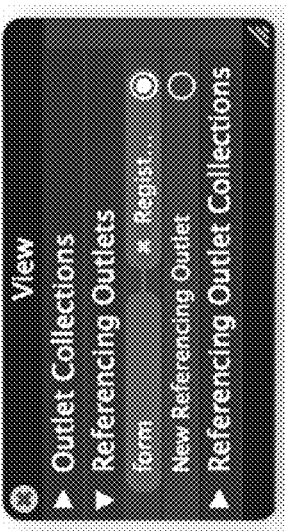
FIGS. 4c and 4d: show information relating to a form view and a label view.
Figure 4D:
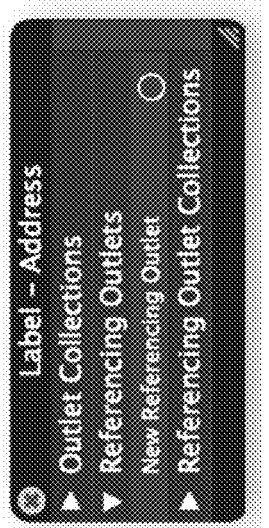

The view structure shown in FIG. 4b notes that the register controller has one root view 400, containing one child view 401.

Views can be referenced by their parent views or the controller. When a view is directly referenced by a variable it effectively has a name, the name of the variable. Inspecting the child view 401 shown, in FIG. 4c, reveals it is referenced by the controller using the id "form".

The model information generated for the form view would be:

```
{
    "x" : 16,
    "y" : 10,
    "width" : 288,
    "height" : 490
    "id" : "view#form",
    "ids" : ["view"],
    "controller" : "registercontroller",
    "subviews" : [.....],
    "type" : "View",
    "style" : {...},
}
```

In this case, the explicit id (unique id) for the form view is simply the variable name.

However, some views lack a unique variable name. In these circumstances, a unique id can be generated from the context. For example, the address view 402 comprising a label (information as shown in FIG. 4d) lacks a variable name.

The corresponding model information for the address view 402 is:

```
{
    "x" : 9,
    "y" : 194,
    "width" : 63,
    "height" : 21,
    "text" : "Address",
    "id" : "view#form > label:nth-of-type(1)",
    "ids" : [view, label, view#form label, view#form > label],
    "controller" : "registercontroller",
    "type" : "Label",
    "style" : {...},
}
```

In this case, an "nth-of-type" selector may be constructed. This may be more robust than "nth-child" selector because it takes account of both type and location amongst its siblings. The "nth-of-type" construction is a recursive process travelling up the view hierarchy until a view with an explicit id is found.

This label also has multiple non-unique ids. It can be targeted inside form view firstly as a direct child or secondly as a non-direct child, which is more general. It can also be targeted more generally as a label, or as a view. There may be advantages to enabling the user to apply the styles more generally as this saves time in the editor by not having to re-enter styling for each similar view.

The ids are unique inside the controller but not across the entire app. Apps typically contain multiple controllers, which could use the same variable names to describe different views. To make these ids unique for the entire app the controller name may also be uploaded for all views. This allows the CSS, forming the instructions to the application, to be targeted specifically for this controller so, for example, the id "#form" above is converted to "registercontroller #form". This method of constructing globally unique ids is assumed for most user changes, unless the changes are intended to be global style changes.

Figure 5:
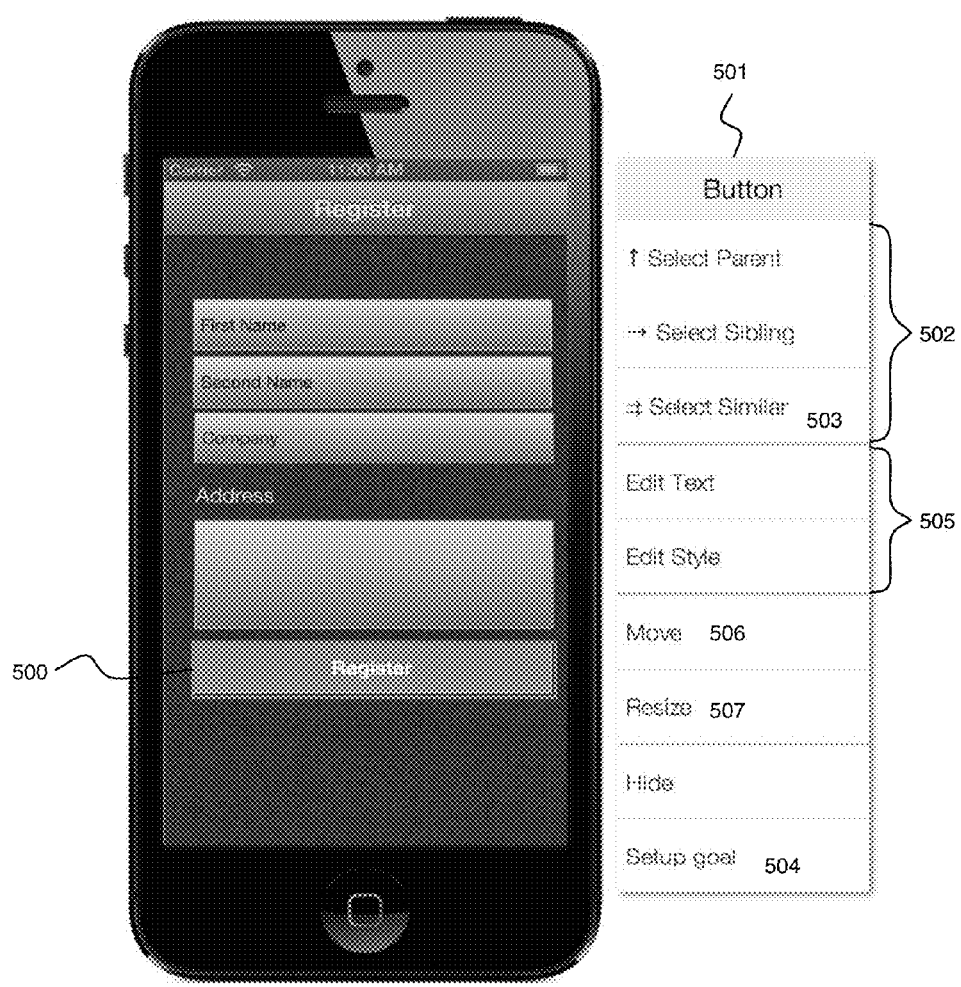
FIG. 5: shows a screenshot illustrating a graphical user interface of an editing component in accordance with an embodiment of the invention.

FIG. 5 shows a screenshot showing a simulated view of an application in a graphical user interface provided by the editing component in accordance with one embodiment of the invention.

In the simulated view, the selected component 500 may be highlighted using an overlay over the existing screenshot. The editor (the editing component) can align the highlighted view over the button by using the model transmitted by the library from the device 101.

On the menu 501, the first set of options 502 help navigate the view structure, such as selecting a view's parent, sibling or child views. This may be necessary as views may obscure each other and may be otherwise impossible to select.

The final navigation option 503 selects similar views. For this option, views are automatically selected if they share a non-unique id for the originally selected view. Views will have multiple non-unique ids, which may be ordered by similarity. The user can select between these different levels of similarity, matching, for example, only buttons or, more generally, all inputs.

The final option "Setup Goal" 504 enables the user to add an analytic feature, such as a click counter to a button.

Enabling the click counter for this button view generates the following CSS rule:
button#label{-editor-enable-click-goal:true}

The configuration option is expressed as a custom CSS property:
-editor-enable-click-goal This illustrates delivery of general configuration options to specific views in a within recoding the app. This is advantageous as existing approaches to adding analytics to a button requires access to the code base and knowledge of programming.

The analytics configuration is applied at the same time as the styling properties. Instead of changing the view's appearance, however, an additional listener is attached to identify when a user taps the view. These clicks are recorded by the library and uploaded periodically to the server 105.

The server 105 may then interpret the analytics data and record it for the style defined in that instance of the app. This may enable a metrics based comparison of different styles, which is advantageous to users of the editor to help them improve their app.

The remaining options 505 offer ways to edit the selected view's style. Moving 506 and resizing 507 options employ a simple drag and drop mechanism.

Figure 6:
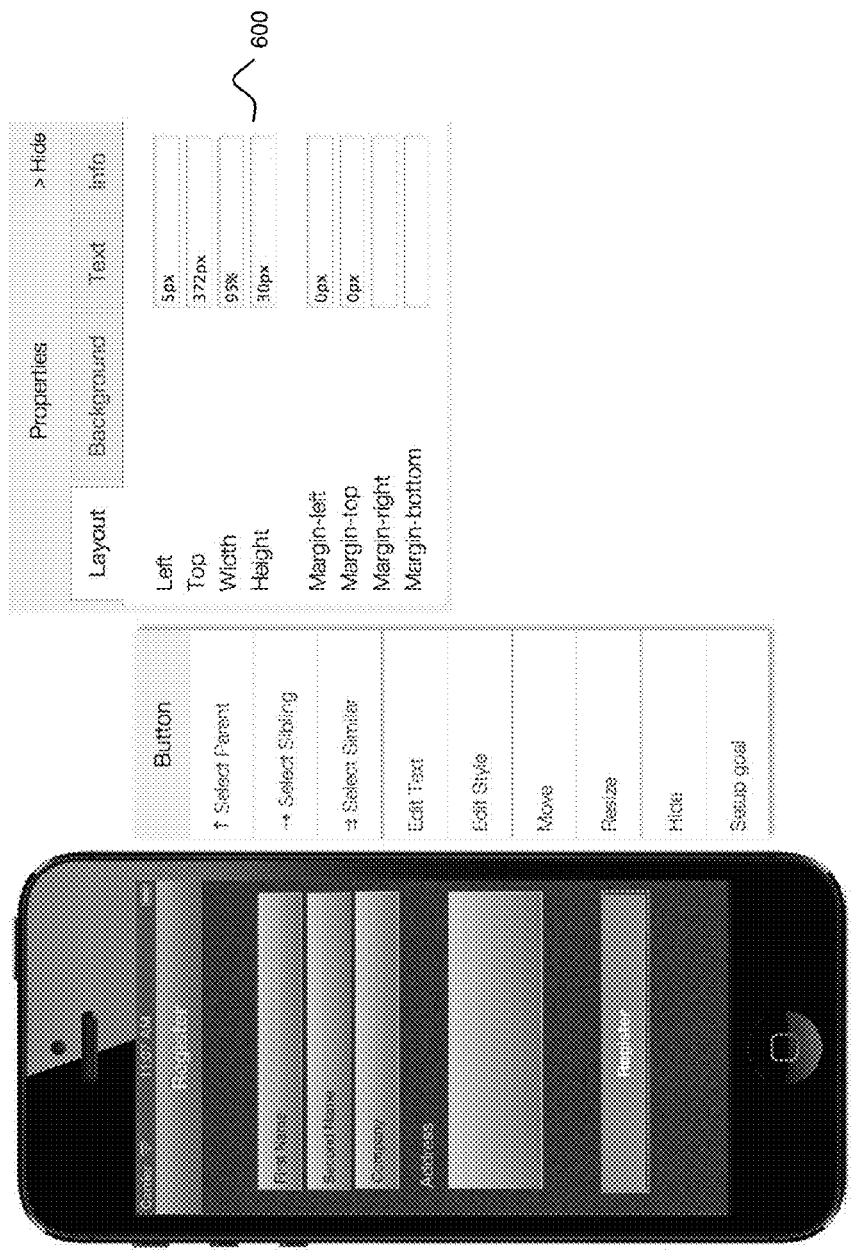
FIG. 6: shows a screenshot illustrating a graphical user interface of an editing component in accordance with an embodiment of the invention.

FIG. 6 shows a screenshot illustrating the properties that may be modified by the user in accordance with an embodiment of the invention.

The properties window 600 presents the view's styling in more detail. This is an editable panel where users can review and make changes using text. The CSS properties are pre-populated using the current style in the model transmitted by the library.

Figure 7:
FIG. 7: shows a CSS editing window within an editing component in accordance with an embodiment of the invention.
Figure 8:
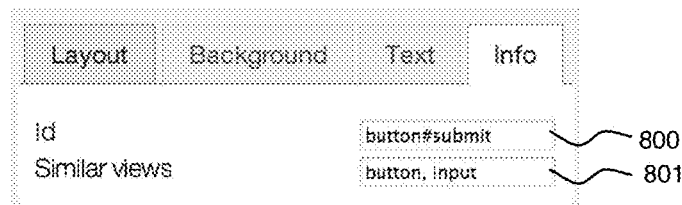
FIG. 8: shows a display exposing CSS selectors for views within an editing component in accordance with an embodiment of the invention.

FIG. 7 shows a screenshot illustrating CSS that may be modified by the user and FIG. 8 shows a screenshot illustrating exposure of the CSS selectors to the user.

Advanced users may wish to provide their own CSS (forming the instructions that are sent to the library), to accelerate development, which may be done within an input box 700.

This, however, creates a problem of determining which CSS selectors to use. To help them the properties window exposes each view's id 800 and similar views 801.

These selectors cannot be edited, but may be used by the user for creating custom CSS.

In one embodiment, when the editor detects an embedded webview within the application, it can treat this as a native view, which is editable in the editor interface. To facilitate modifications to the webview, native CSS rules can be applied to the webview involving a two step process:
(1) The CSS is translated to the webview's perspective. For example, considering the following CSS rule:
registercontroller webview h1 {color:red}

For this to work correctly in the webview, the CSS rules matching the webview itself have to be removed leaving:
h1 {color:red}
(2) The modified CSS rule is injected into the webview's HTML content by either editing the HTML before the webview is loaded or injecting the styling information using javascript.

In one embodiment, when a property is changed in the editor, this needs to be reflected in the simulated view. The simulated view is not an active process and merely present screenshots from the preview device. Therefore, as the editor contains no simulation logic itself, it can only rely on the uploads from the connected preview device to generate the simulated view. It is necessary to preview changes on the preview device to update the simulated view, but also to ensure the changes have the expected effect on the preview device.

In an alternative embodiment, the editor could potentially predict how the updated application on the device will appear (for example, if a view is moved by 10 px).

An embodiment of the system in use will now be described in relation to FIGS. 9*a* to 9*e*.

Figure 9B:
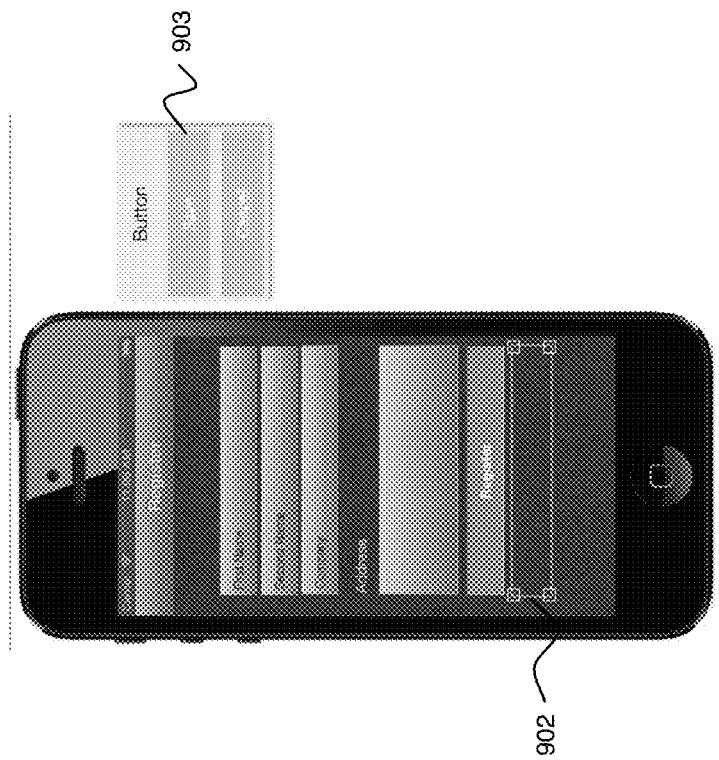
FIGS. 9a to 9c: show screenshots of a simulated application within an editing component in accordance with an embodiment of the invention.
Figure 9A:
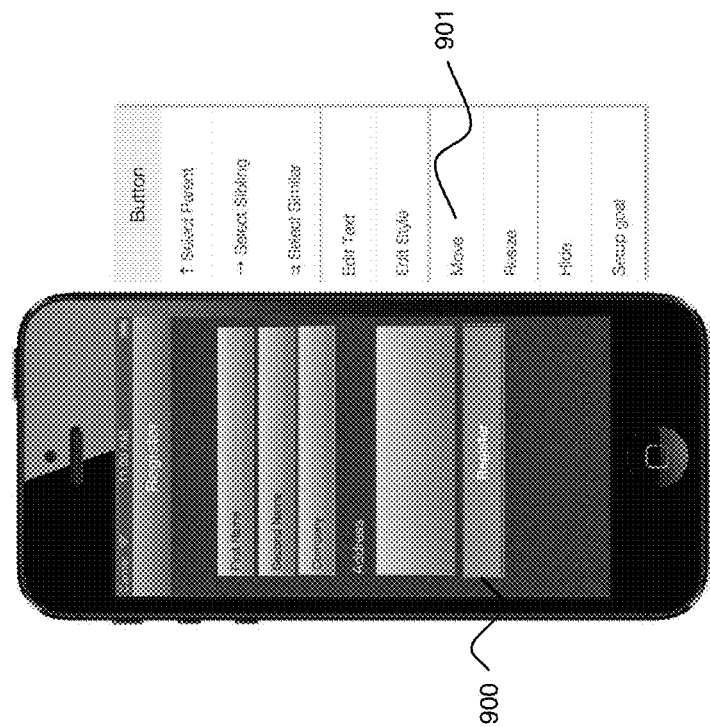

The user selects a view 900 in FIG. 9*a*.

They select 'Move' 901, drag the button to a different position 902, and hit save 903 as shown in FIG. 9*b*.

Figure 9D:
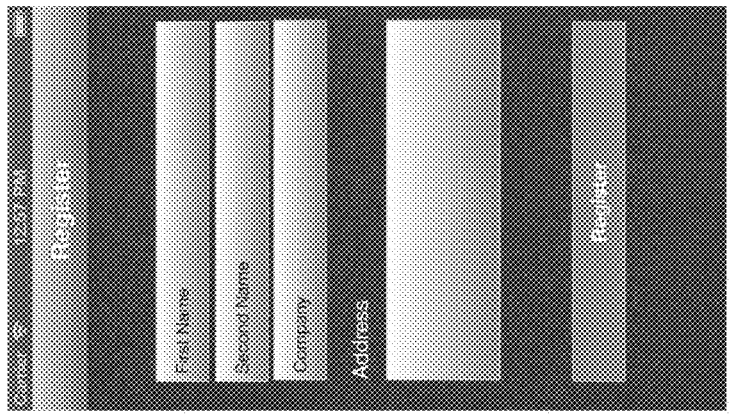
FIG. 9d: shows a screenshot of an application executing on a device in accordance with an embodiment of the invention.
Figure 9C:
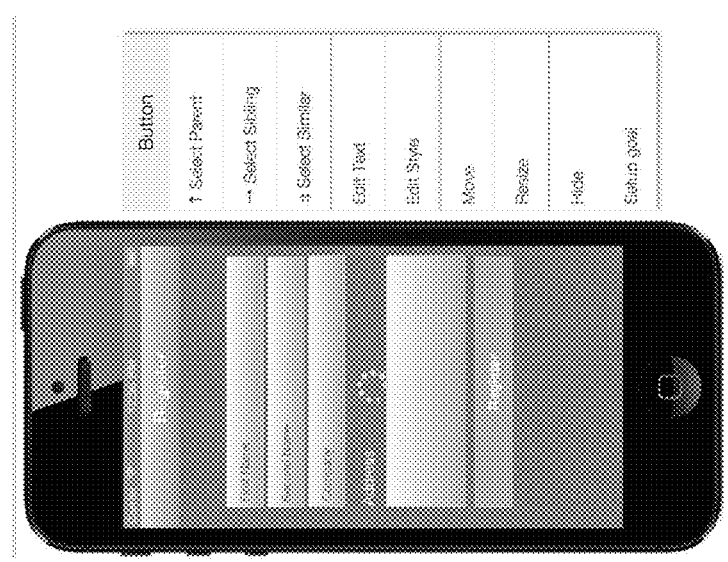

Whilst the editor is updating a wait screen is shown in FIG. 9*c*. This indicates the simulated view is out of date.

Meanwhile the editor creates the following CSS rule:
button#submit{top:372px}

This CSS rule consists of a CSS selector and a CSS property. As only the submit button was selected, the unique id is the selector: button#submit. The CSS property top: 372px was calculated from model information for the view and by the displacement recorded in the editor.

This new CSS rule is appended to the existing CSS file, and any previous rules for the same view and property are removed.

The library periodically downloads the CSS and applies it. It re-records the interface and uploads it to the server 105. This information contains a new and updated screenshot, as shown in FIG. 9*d*, and an updated model containing the new button position and styling, as shown below:

```
{
"id" : "button#submit",
"y" : 372,
"style" : {
"top" : "372px",
}
... .
}
```

Figure 9E:
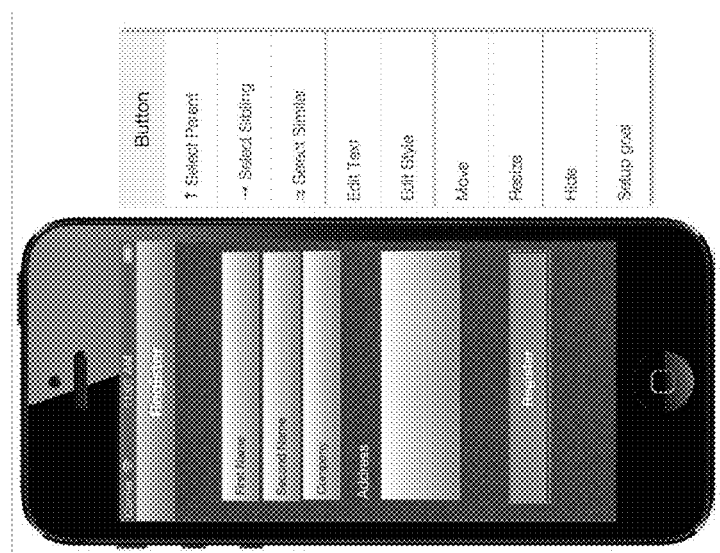
FIG. 9e: shows a screenshot of simulated application within an editing component in accordance with an embodiment of the invention.

This new information is used to refresh the simulated interface as shown in FIG. 9*e*.

The simulated app has updated its appearance and the model is also updated Potential advantages of some embodiments of the present invention are that during application development, the application can be rapidly previewed, deployment of modifications to applications can be quickly deployed with low transmission overhead, implementation of modifications by developers are simplified, multiple levels of complexity in development are provided for, and access to the source code of the application is not necessary to actuate modifications.

Another potential advantage of some embodiments of the present invention is that, custom hardware can be used to execute the application, this is not necessary and the device to which the application is intended to be deployed for users can be used. The consequent advantage of this is that a custom simulator does not need to be built which improves reliability as a simulator would otherwise need to be rebuilt for every new version of the operating system of the device.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method of dynamically modifying a deployed native application including an embedded library, including:
    executing, by a processing system of a first user apparatus, the native application stored in memory of the first user apparatus and comprising the embedded library, wherein the native application is configured to display, on a display associated with the first user apparatus, a user interface;
    during execution of the application, the library generating and transmitting, to a second user apparatus, a model about the visual appearance of the user interface provided by the application executed on the first user apparatus;
    receiving, by the second user apparatus, the model generated by the library;
    displaying, on a display associated with the second user apparatus, an editing user interface for editing the application executed by the first user apparatus, wherein the editing user interface is configured to generate, based on the received model, a simulation of the application executed by the first user apparatus:
    receiving input from a user at the editing user interface to modify visual appearance of the simulated application;
    in response to the received input, modifying at the second user apparatus, the simulation of the application and generating instructions, utilizing the model, to change visual appearance and functionality of the user interface provided by the application executed by the first user apparatus;
    transmitting by the second user apparatus, the generated instructions to the application executed on first user apparatus for dynamically modifying the application executed on the first user apparatus;
    receiving, by the application executed on the first user apparatus, the generated instructions from the second user apparatus; and
    the application modifying itself, based on the received instructions, to change visual appearance and functionality of the user interface provided by the application.

2. A method as claimed in claim 1, wherein the first user apparatus and the second user apparatus are directly connected.

3. A method as claimed in claim 1, wherein the library transmits, to the second user apparatus, a screenshot of, at least part, of the visual display of the user interface provided by the executing application.

4. A method as claimed in claim 3, wherein the editing user interface utilises the screenshot to generate the simulation.

5. A method as claimed in claim 1, wherein the instructions are transmitted to a plurality of applications deployed on a plurality of devices.

6. A method as claimed in claim 1, wherein the instructions are transmitted to each application of a plurality of applications upon request by that application.

7. A method as claimed in claim 1, wherein the editing user interface provides for the user to select components within the simulated application and, in response to a selection of a component, display options for modifying the component.

8. A method as claimed in claim 7, wherein the editing user interface displays the simulation of the application and programmatically editable format of the application for the user to modify the visual appearance and functionality of the user interface provided by the application.

9. A method as claimed in claim 1, wherein at least a part of the instructions are encoded within Cascading Style Sheets (CSS).

10. A method as claimed in claim 1, wherein the instructions are received by the library.

11. A method as claimed in claim 1, wherein the model is encoded within JavaScript Object Notation (JSON).

12. A method as claimed in claim 1, wherein the input is provided by the user within a graphical user interface such that visual components within the visual appearance are directly edited by the user.

13. A method as claimed in claim 12, wherein editing of the visual components includes one or more of repositioning, deletion, resizing, changing the colour or font, changing an image, and changing text content.

14. A method as claimed in claim 1, wherein the library transmits the model when changes to the visual appearance of the user interface provided by the executed application are detected by the library.

15. A method as claimed in claim 1, wherein the same library is embedded within a plurality of different applications.

16. A method as claimed in claim 1, wherein, after the application receives the instructions and is modified, the library generates and transmits, to the second user apparatus, another model about the visual appearance of the user interface provided by the application.

17. A non-transitory computer readable storage medium having stored therein a library configured for use with the method of claim 1.

18. A non-transitory computer readable storage medium having stored therein an application configured for use with the method of claim 1.

19. A non-transitory computer readable storage medium having stored therein an editing component configured for use with the method of claim 1.

20. A system for dynamically modifying deployed native applications, including a first user apparatus and a second user apparatus:
    the first user apparatus comprising:
        a first display;
        a first processor; and
        a first memory;
    wherein the first user apparatus is configured to:
        execute a native application stored in the first memory and comprising an embedded library, the native application is configured to display, on the first display, a user interface;
        during execution of the application, execute the library to generate and transmit, to the second user apparatus, a model about visual appearance of the user interface provided by the application; and
        in response to transmitting the generated model, receive instructions from the second user apparatus for the library to, based on the received instructions, modify the application to change visual appearance and functionality of the user interface provided by the application; and
    the second user apparatus comprising:
        a second display;
        an input device;
        a second processor; and
        a second memory;
    wherein the second user apparatus is configured to:

receive the model generated by the library from the first user apparatus;

display, on the second display, an editing user interface for editing the application executed by the first user apparatus, the editing user interface is configured to generate, based on the received model, a simulation of the application executed by the first user apparatus;

receive input from a user at the editing user interface to modify visual appearance of the simulated application;

in response to the received input, modify the simulation of the application and generate instructions, utilising the model, to change visual appearance and functionality of the user interface provided application executed by the first user apparatus; and transmit the generated instructions to the first user apparatus for dynamically modifying the application executed on the first user apparatus.

21. A system as claimed in claim 20, wherein the first and second apparatus communicate via a server and the server is configured to distribute the generated instruction for modifying applications executed on a plurality of other apparatuses.

22. A method of dynamically modifying a deployed native application including an embedded library, including:

executing, by a processing system of a first user apparatus, the native application stored in memory of the first user apparatus and comprising the embedded library, wherein the native application is configured to display, on a display associated with the first user apparatus, a user interface;

during execution of the application, the library generating and transmitting, to a second user apparatus, a model about visual appearance of the user interface provided by the application executed on the first user apparatus;

receiving, by the second user apparatus, the model generated by the library;

displaying, on a display associated with the second user apparatus, an editing user interface for editing the application executed by the first user apparatus, wherein the editing user interface is configured to generate, based on the received model, a simulation of the application executed by the first user apparatus;

receiving input from a user at the editing user interface to modify visual appearance of the simulated application;

in response to the received input, modifying at the second user apparatus, the simulation of the application and generating instructions, utilizing the model, to change visual appearance and functionality of the user interface provided application executed by the first user apparatus;

transmitting, by the second user apparatus, the generated instructions to the application executed on first user apparatus for dynamically modifying the application executed on the first user apparatus;

receiving, by the application executed on the first user apparatus, the generated instructions from the second user apparatus; and the application modifying itself, based on the received instructions, to change visual appearance and functionality of the user interface provided by the application, wherein the library transmits the model when changes to the visual appearance to the user interface provided by the application are detected.

23. A non-transitory computer readable storage medium having stored therein a library configured for use with the method of claim 22.

24. A non-transitory computer readable storage medium having stored therein an application configured for use with the method of claim 22.

25. A non-transitory computer readable storage medium having stored therein an editing component configured for use with the method of claim 22.

26. A system for dynamically modifying deployed native applications, including a first user apparatus and a second user apparatus:

the first user apparatus comprising:
a first display;
a first processor; and
a first memory;

wherein the first user apparatus is configured to:
execute a native application stored in the first memory and comprising an embedded library, the native application is configured to display, on the first display, a user interface;

during execution of the application and when changes to visual appearance of the user interface are detected, execute the library to generate and transmit, to the second user apparatus, a model about visual appearance of the user interface provided by the application; and user apparatus in response to transmitting the generated model, receive instructions from the second user apparatus for the library to, based on the received instructions, modify the application to change visual appearance and functionality of the user interface provided by the application; and a second user apparatus comprising:
a second display;
an input device;
a second processor; and
a second memory;

wherein the second user apparatus is configured to:
receive the model generated by the library from the first user apparatus;

display, on the second display, an editing user interface for editing the application executed by the first user apparatus, the editing user interface is configured to generate, based on the received model, a simulation of the application executed by the first user apparatus;

receive input from a user at the editing user interface to modify visual appearance of the simulated application;

in response to the received input, modify the simulation of the application and generate instructions, utilising the model, to change visual appearance and functionality of the user interface provided application executed by the first user apparatus; and transmit the generated instructions to the first user apparatus for dynamically modifying the application executed on the first user apparatus.

27. A system as claimed in claim 26, wherein the first and second user apparatus communicate via a server and the server is configured to distribute the generated instruction for modifying applications executed on a plurality of other user apparatuses.

28. A system as claimed in claim 26, wherein the application executed on the first user apparatus includes a preview mode and a non-preview mode, and the library generates and transmits, to the second user apparatus, the model about the visual appearance of the user interface provided by the application only when the application is in the preview mode.

* * * * *